US012709648B2

(12) United States Patent
Adbelfatah et al.

(10) Patent No.: US 12,709,648 B2
(45) Date of Patent: Aug. 18, 2026

(54) PROCESS FOR MANUFACTURING OF NANOCRYSTALLINE CELLULOSE (NCC)

(71) Applicant: SixRing Inc., Calgary (CA)

(72) Inventors: Elsayed Adbelfatah, Shelton, CT (US); Alejandra Enriquez, Calgary (CA); Markus Weissenberger, Calgary (CA)

(73) Assignee: SixRing Inc., Calgary (CA)

( * ) Notice: Subject to any disclaimer, the term of this patent is extended or adjusted under 35 U.S.C. 154(b) by 419 days.

(21) Appl. No.: 18/392,146

(22) Filed: Dec. 21, 2023

(65) Prior Publication Data

US 2024/0209121 A1 Jun. 27, 2024

(30) Foreign Application Priority Data

Dec. 22, 2022 (CA) ................................ CA 3184540

(51) Int. Cl.
*C08B 15/02* (2006.01)
*C08B 1/00* (2006.01)
*C08L 1/04* (2006.01)

(52) U.S. Cl.
CPC ................ *C08B 15/02* (2013.01); *C08B 1/00* (2013.01); *C08L 1/04* (2013.01)

(58) Field of Classification Search
CPC .................................. C08B 15/02; C08B 1/00
See application file for complete search history.

(56) References Cited

U.S. PATENT DOCUMENTS

| | | | |
|---|---|---|---|
| 2,855,351 | A | 10/1958 | Robert |
| 3,509,206 | A | 4/1970 | Nielsen |
| 3,655,738 | A | 4/1972 | Nielsen |
| 4,222,819 | A | 9/1980 | Fossum et al. |
| 4,626,319 | A | 12/1986 | Krueger et al. |
| 4,704,404 | A | 11/1987 | Sanderson |
| 4,756,845 | A | 7/1988 | Sugawara et al. |
| 4,935,499 | A | 6/1990 | Ruske et al. |
| 5,080,756 | A | 1/1992 | Kutney |
| 5,691,193 | A | 11/1997 | Paice et al. |
| 5,955,050 | A | 9/1999 | Drexler |
| 6,770,168 | B1 | 8/2004 | Stigsson |
| 9,499,405 | B2 | 11/2016 | Dindi |
| 9,890,321 | B2 | 2/2018 | Shumway |
| 10,144,786 | B2 | 12/2018 | Hindi et al. |
| 11,668,047 | B2 | 6/2023 | Purdy et al. |
| 11,821,139 | B2 | 11/2023 | Purdy et al. |
| 11,905,656 | B2 | 2/2024 | Purdy et al. |
| 11,982,051 | B2 | 5/2024 | Weissenberger et al. |
| 11,982,052 | B2 | 5/2024 | Purdy et al. |
| 12,071,724 | B2 | 8/2024 | Purdy et al. |
| 2003/0224960 | A1 | 12/2003 | Scialla et al. |
| 2004/0099637 | A1 | 5/2004 | Johnson et al. |
| 2010/0291722 | A1 | 11/2010 | Kim et al. |
| 2012/0217500 | A1 | 8/2012 | Park et al. |
| 2013/0122701 | A1 | 5/2013 | Krupa et al. |
| 2013/0156631 | A1 | 6/2013 | Kumagai et al. |
| 2014/0113843 | A1 | 4/2014 | Shumway |
| 2014/0121145 | A1 | 5/2014 | Paasche et al. |
| 2014/0349359 | A1 | 11/2014 | Fernholz et al. |
| 2016/0017540 | A1 | 1/2016 | Paripati et al. |
| 2016/0021888 | A1 | 1/2016 | Burke et al. |
| 2016/0074549 | A1 | 3/2016 | Lei et al. |
| 2016/0264420 | A1 | 9/2016 | Dindi |
| 2016/0298294 | A1 | 10/2016 | Dietz et al. |
| 2016/0304989 | A1 | 10/2016 | Pujari et al. |
| 2020/0010959 | A1 | 1/2020 | Hong |
| 2021/0269394 | A1 | 9/2021 | Purdy et al. |
| 2021/0269970 | A1 | 9/2021 | Purdy et al. |
| 2021/0269971 | A1 | 9/2021 | Purdy et al. |
| 2022/0267956 | A1 | 8/2022 | Purdy et al. |
| 2023/0382852 | A1 | 11/2023 | Purdy et al. |
| 2023/0416985 | A1 | 12/2023 | Purdy et al. |
| 2024/0209121 | A1 | 6/2024 | Adbelfatah et al. |
| 2024/0263394 | A1 | 8/2024 | Purdy et al. |
| 2024/0295073 | A1 | 9/2024 | Purdy et al. |

FOREIGN PATENT DOCUMENTS

| | | | |
|---|---|---|---|
| CA | 2134270 | A1 | 4/1996 |
| CA | 2744569 | A1 | 6/2010 |
| CA | 2889135 | A1 | 5/2014 |

(Continued)

OTHER PUBLICATIONS

Coastal Chemical: Diethanolamine (DEA) Secondary Amine [online], [retrieved on Nov. 5, 2022]. , Retrieved from the internet:< URL:https://coastalchem.com/products/generic-amines/diethanolamine-dea-secondary-amine/.> (Year: 2025).

Dow: Ethanolamines [online], [retrieved on Nov. 5, 2022]. Retrieved from the internet , URL: http://www.resikem.com.ar/images/dow-ethanolamines.pdf. (Year: 2025).

International Preliminary Report on Patentability issued in PCT/CA2021/000068 on Dec. 9, 2021, 6 pages.

(Continued)

*Primary Examiner* — Layla D Berry

(74) *Attorney, Agent, or Firm* — Blank Rome LLP

(57) ABSTRACT

A process to manufacture nanocrystalline cellulose from cellulose having a low hemicellulose content, said process comprising the steps of:

exposing said cellulose to a microemulsion composition for a first pre-determined period of time, thereby creating a soaked cellulose;

optionally, exposing the soaked cellulose to a sonication step for a second predetermined period of time; and exposing the resulting mixture to a $H_2O_2$ with $FeSO_4$ or $CuSO_4$ under acidic conditions for a third pre-determined period causing hydrolysis of the cellulose;

wherein the nanocrystalline cellulose will have a crystallinity index of more than 50% and an aspect ratio ranging from 10:1 length to width to 50:1 length to width.

24 Claims, 5 Drawing Sheets

(56) References Cited

FOREIGN PATENT DOCUMENTS

| | | | |
|---|---|---|---|
| CA | 2923100 | A1 | 9/2016 |
| CA | 3128672 | A1 | 8/2022 |
| CA | 3128673 | A1 | 8/2022 |
| CA | 3128674 | A1 | 8/2022 |
| CA | 3128675 | A1 | 8/2022 |
| CA | 3128676 | A1 | 8/2022 |
| CA | 3128677 | A1 | 8/2022 |
| CN | 1470552 | A | 1/2004 |
| CN | 102432686 | B | 6/2013 |
| CN | 103572306 | A | 2/2014 |
| CN | 103820796 | A | 5/2014 |
| CN | 104040061 | A | 9/2014 |
| CN | 107190547 | A | 9/2017 |
| CN | 108069519 | A | 5/2018 |
| CN | 108468050 | A | 8/2018 |
| CN | 108624237 | A | 10/2018 |
| CN | 109628934 | A | 4/2019 |
| CN | 109761380 | A | 5/2019 |
| CN | 109877097 | A | 6/2019 |
| CN | 109898085 | A | 6/2019 |
| CN | 110485188 | A | 11/2019 |
| CN | 108779183 | B | 6/2021 |
| EP | 0199385 | A2 | 10/1986 |
| EP | 0779357 | A1 | 6/1997 |
| FI | 126118 | B | 6/2016 |
| JP | H07206804 | A | 8/1995 |
| JP | 2010285697 | A | 12/2010 |
| KR | 20150114655 | A | 10/2015 |
| MY | 189437 | A | 2/2022 |
| RU | 2634586 | C1 | 10/2017 |
| SE | 539317 | C2 | 6/2017 |
| WO | 9612673 | A1 | 5/1996 |
| WO | 2010106182 | A1 | 9/2010 |
| WO | 2014065972 | A1 | 5/2014 |
| WO | 2019055789 | A1 | 3/2019 |

OTHER PUBLICATIONS

PubChem: Ethanolamine (Compound) [online], [retrieved on Nov. 5, 2022], Retrieved from the internet:< URL: https://pubchem.ncbi.nlm.nih.gov/compound/Ethanolamine.> (Year: 2025).

The Chemical Company: Triethanolamine (TEA, TEOA) [online], [retrieved on Nov. 5, 2022] , Retrieved from the internet:< URL:https ://thechemco.com/chemical/triethanolamine/. > (Year: 2025).

Kuznetsov , et al. , Kinetic study of aspen-wood sawdust delignification by H2O2 with sulfuric acid catalyst under mild conditions , Reac Kinet Mech Cat (2013) 110:271-280 (Year: 2013).

Rackemann , et al. , The effect of pretreatment on methanesulfonic acid-catalyzed hydrolysis of bagasse to evulnic acid, formic acid, and furfural , RSC Advances. 2016. 6(78):74525-35.

Regis , What do these terms mean—Kappa values? [online], [retrieved on Sep. 30, 2024]. , Retrieved from the internet: < URL: https://www.regis.de/en/pages/What-do-these-terms-mean-Kappa-values-/1719/ > (Year: 2024).

Takovlev , et al. , SO2-Ethanol-Water (SEW) Pulping: I. Lignin Determination in Pulps and Liquors, 2011 , Journal of Wood Chemistry and Technology, 31, p. 233-249 (Year: 2011).

Tang , et al. , Organic amine catalytic organosolv pretreatment of corn stover for enzymatic saccharification and high-quality lignin , Bioresource Technology, 2017, 232, 222-228 (Year: 2017).

Fan, Xue-Meng et al., "Facile and green synthesis of carboxylated cellulose nanocrystals as efficient adsorbents in wastewater treatments", ACS Sustainable Chem. Eng., Just Accepted Manuscript • DOI: 10.1021/acssuschemeng.9b05081 Publication Date (Web): Oct. 9, 2019 Downloaded from pubs.acs.org on Oct. 12, 2019, 34 pgs.

PROCESS FOR MANUFACTURING OF NANOCRYSTALLINE CELLULOSE (NCC)

CROSS-REFERENCE TO RELATED APPLICATION

This application is a claims the benefit of Canada Application No. 3,184,540, filed Dec. 22, 2022, the entire contents of which are incorporated herein by reference.

FIELD OF THE INVENTION

The present invention is directed to a process to manufacture nanocrystalline cellulose, more specifically the process converts highly delignified cellulose fibers into nanocrystalline cellulose by applying a pre-treatment to the former.

BACKGROUND OF THE INVENTION

Nanocrystalline cellulose (NCC) or cellulose nanocrystals (CNCs) has many attractive characteristics, such as a high specific surface area, high thermal stability, a large number of functional groups, biocompatibility, high crystallinity, and macroscopic material advantages of properties, which come with the colloidal size range of 1 to 500 nm. Due to these, it has a number of different applications in wastewater treatment systems, emulsification and Pickering emulsions, food, cosmetics, structured materials, polymer nanocomposites, cementitious composites, etc.

Using sonication for making NCC from microcrystalline cellulose (MCC) has been reported in the literature. However, very powerful sonicators (500 W) were used for extended period of time (at least 50 minutes). This process is hard to scale up due to the technical issues associated with operating ultrasonic processors for long periods of time that includes enormous amounts of heat generation.

Radical-based catalytic decomposition of cellulose to NCC is discussed in Facile and Green Synthesis of Carboxylated Cellulose Nanocrystals as Efficient Adsorbents in Wastewater Treatments. *ACS Sustainable Chem. Eng.* 2019, 7, 21, 18067-18075.

Chinese patent CN108779183B teaches a method for producing nanocellulose, said method comprising the steps of: a) providing a cellulose-containing material, wherein the cellulose-containing material comprises less than 20 wt % water; b) contacting the cellulose-containing material with oxalic acid dihydrate and heating above the melting point of oxalic acid dihydrate to obtain cellulose oxalate; c) washing the mixture; d) preparing a suspension containing the washed material from step c); and c) recovering the nanocellulose from the suspension. The present invention also relates to a process for the manufacture of a nanocellulose intermediate, said process comprising the above steps a) to c).

Chinese patent CN102432686B teaches a micro-nano cellulose that is obtained by reacting microcrystalline cellulose and a metal salt with a high-boiling point alcohol solution. Its preparation method comprises the steps: (1) combining microcrystalline cellulose with the metal salt high-boiling point alcohol solution, to form a liquid suspension; (2) reacting the liquid suspension for 1-8 h under 100° C.~240° C., to obtain a microcrystalline cellulose/metal-salt mixed solution; (3) combining distilled water with the microcrystalline cellulose/metal-salt mixed solution and centrifuging the mixture.

Swedish patent SE539317C2 teaches a method for manufacturing nanocrystalline cellulose, said method comprising the steps of: a. providing a cellulose-containing material wherein the cellulose-containing material contains less than 20 wt % water, preferably less than 10 wt. % water, b. contacting the cellulose-containing material with oxalic acid dihydrate, and heating above the melting point of the oxalic acid dihydrate, to obtain cellulose oxalates, c. washing the mixture resulting from step b), d. preparing a suspension comprising the washed material from step c), and c. recovering nanocrystalline cellulose from the suspension.

Finnish patent FI126118B teaches a process for preparing nanofibrillated cellulose comprising the steps of pretreating native cellulosic pulp, said pretreating comprising the steps of contacting an aqueous suspension of native cellulosic pulp with an inorganic or organic acid and mixing to bring the pH of the suspension to below 4 and then removing the water and washing the solid with water, forming an aqueous suspension of the solid, then adding at least one water-soluble $NH_4^+$, alkali metal or alkaline earth metal or metal salt to the formed suspension, mixing to adjust the pH to more than 7 with an inorganic base, then removing the water to obtain pre-treated native cellulosic pulp; and then forming an aqueous suspension of the pretreated native cellulosic pulp and mechanically disintegrating it in a fluidizer-type disintegrator. The patent states that the organic acid is selected from $C_1$-$C_8$ carboxylic acids, and the inorganic acid is selected from hydrochloric acid, nitric acid, hydrobromic acid and sulfuric acid. The patent further specifies that the organic acid is preferably selected from acetic acid, formic acid, butyric acid, propionic acid, oxalic acid and lactic acid.

Malaysian patent document MY189437 discloses a method of producing nanocellulose from sugarcane bagasse (SCB) comprising the step of subjecting the SCB to sodium hydroxide treatment for partial separation of lignin and hemicellulose therefrom; bleaching the pre-treated SCB with hydrogen peroxide solution for further removal of lignin and hemicellulose to obtain cellulose; ultrasonicating the cellulose to obtain nanocellulose; and hydrolyzing the nanocellulose with 0.1 to 1% (v/v) of sulphuric acid solution to obtain nanocellulose with an aspect ratio of 100-150.

Chinese patent application CN1470552A discloses a nano-grade cellulosic particulate preparation method that comprises the steps: (1) the microcrystalline cellulose aggregate and antioxidant are dissolved in the cellosolve and stirred to obtain a cellulose suspension; (2) the cellulose suspension is added into the precipitating solvent that contains a dispersion agent, by stirring and emulsifying a nano-cellulose particulate emulsion is formed.

U.S. Pat. No. 10,144,786B2 teaches a method of making nanocrystalline cellulose, consisting of the sequential steps of: grinding cellulosic fibers to produce ground cellulose fiber; drying the ground cellulose fiber to produce dried, ground cellulose, wherein the drying is done at about 105° C. for two hours; freeze-drying the dried, ground cellulose by exposing the dried, ground cellulose to liquid nitrogen-vapor for five minutes to produce lyophilized cellulose; adding at least 98.06% pure sulfuric acid to the lyophilized cellulose at a liquid/solid ratio of 1:1 (vol/wt) and stirring to form a cellulosic paste; diluting the cellulose paste in a cold liquid at a liquid/solid ratio of 1:1 (vol/wt) to form a cellulosic solution, wherein the cold liquid is selected from the group consisting of water and absolute ethanol; filtering the cellulosic solution under cooling by liquid nitrogen-vapor to produce a nanocrystalline cellulose precipitate; washing the nanocrystalline cellulose precipitate until neutralization, wherein the washing is performed in a liquid selected from the group consisting of cold water and ethanol; and air-drying the washed nanocrystalline cellulose precipitate for one hour to yield a nanocrystalline cellulose product, wherein the cellulose product comprises cellulose needles configured as whiskers.

In light of the prior art, there is a clear need for a method which will allow the conversion of cellulose fibers to nanocrystalline cellulose. It has been determined that a cellulosic feedstock which has a low lignin and low hemicellulose content is more readily converted to a nanocellulose by using a process which comprises exposure to an emulsion.

SUMMARY OF THE INVENTION

According to an aspect of the present invention, there is provided a process to manufacture nanocrystalline cellulose from a cellulose having a low hemicellulose content, said process comprising the steps of:

- exposing said cellulose to a solution comprising a microemulsion for a first pre-determined period of time, thereby creating a soaked cellulose;
- optionally, exposing the soaked cellulose to a sonication step for a second predetermined period of time; and
- exposing the resulting mixture to a source of peroxide (such as $H_2O_2$) with a metal salt selected from the group consisting of: $FeSO_4$ or $CuSO_4$ under acidic conditions for a third pre-determined period causing hydrolysis of the cellulose; and
- recovering the resulting nanocrystalline cellulose.
- wherein the starting cellulose has a particle size ranging from 100 to 1000 μm.

Preferably, the nanocrystalline cellulose will have a crystallinity index of more than 50%. and an aspect ratio ranging from 10:1 length to width to 50:1 length to width.

According to a preferred embodiment of the present invention, the step of exposing the resulting mixture to a source of peroxide with a metal salt occurs at a pH below 7.

According to a preferred embodiment of the present invention, said microemulsion composition comprises:

- water;
- a solvent;
- a nonionic surfactant;
- a hydrophobic component.

Preferably, the solvent is selected from the group consisting of: ethanol; methanol; isopropanol; propanol and other short chain alcohols.

According to a preferred embodiment of the present invention, the nonionic surfactant is selected from the group consisting of alcohol ethoxylates and/or alkyl polyglucosides.

According to a preferred embodiment of the present invention, the hydrophobic component is selected from the group consisting of mineral oil, silicon oil, paraffin oil, and pale oil or a terpene.

According to a preferred embodiment of the present invention, an inorganic and/or organic base is added to the microemulsion; where said base is selected from the group consisting of: sodium hydroxide, potassium hydroxide, ammonium hydroxide and alkanolamines such as monoethanolamine (MEA); diethanolamine (DEA); triethanolamine (TEA) and combinations thereof.

Preferably, the hydrophobic component is present in the composition in an amount ranging from 0.1 wt. % to 20% wt. More preferably, the hydrophobic component is present in the composition in an amount ranging from 1 wt. % to 15% wt.

Preferably, the solvent is present in the composition in an amount ranging from 0.1 wt. % to 20% wt.

Preferably, the microemulsion composition is added to the water in a concentration ranging from 0.1 to 90% wt.

According to an aspect of the present invention, there is provided a process to manufacture nanocrystalline cellulose from cellulose having a low lignin and low hemicellulose content, said process comprising the steps of:

- exposing said cellulose to a microemulsion composition for a first pre-determined period of time, thereby creating a soaked cellulose;
- optionally, exposing the soaked cellulose to a sonication step for a second predetermined period of time;
- exposing the resulting mixture to a source of peroxide (such as $H_2O_2$) with a metal salt selected from the group consisting of: $FeSO_4$ or $CuSO_4$ under acidic conditions, for a third pre-determined period causing hydrolysis of the cellulose; and
- recovering the resulting nanocrystalline cellulose.

According to another aspect of the present invention, there is provided a method for the preparation of nanocrystalline cellulose from a biomass, where said method comprises the following steps:

- providing a biomass feedstock comprising: cellulose; hemicellulose; and lignin;
- exposing the biomass to a modified Caro's acid selected from the group consisting of:
  - composition A; composition B and Composition C;
  - wherein said composition A comprises:
    - sulfuric acid in an amount ranging from 20 to 70 wt % of the total weight of the composition;
    - a compound comprising an amine moiety and a sulfonic acid moiety selected from the group consisting of: taurine; taurine derivatives; and taurine-related compounds; and
    - a peroxide;
  - wherein said composition B comprises:
    - an alkylsulfonic acid; and
    - a peroxide; wherein the acid is present in an amount ranging from 40 to 80 wt % of the total weight of the composition and where the peroxide is present in an amount ranging from 10 to 40 wt % of the total weight of the composition;
  - wherein said composition C comprises:
    - sulfuric acid;
    - a compound comprising an amine moiety;
    - a compound comprising a sulfonic acid moiety; and
    - a peroxide;
- to create a biomass/acid mixture
- allow exposure for a period of time sufficient to dissolve enough of the lignin present in said biomass mixture to obtain a kappa number for the cellulose of less than 10 and more preferably, less than 5;
- separating the liquid from the solid portion of delignification mixture;
- optionally, exposing the solid portion to a caustic composition to dissolve the hemicellulose present therein;
- extracting the remaining cellulose;
- optionally, adjusting the pH of the cellulose;
- exposing said cellulose to a microemulsion composition for a first pre-determined period of time, thereby creating a soaked cellulose;
- optionally, exposing the soaked cellulose to a sonication step for a second predetermined period of time;
- exposing the resulting mixture to a source of peroxide (such as $H_2O_2$) with a metal salt selected from the group consisting of: $FeSO_4$ or $CuSO_4$, for a third pre-determined period causing hydrolysis of the cellulose; and recovering the resulting nanocrystalline cellulose.

According to another aspect of the present invention, there is provided a method for increasing the yield of nanocrystalline cellulose from a cellulose having a low hemicellulose content, said process comprising the steps of:

exposing said cellulose to a solution comprising a microemulsion for a first pre-determined period of time, thereby creating a soaked cellulose;

optionally, exposing the soaked cellulose to a sonication step for a second predetermined period of time; and exposing the resulting mixture to a source of peroxide (such as $H_2O_2$) with a metal salt selected from the group consisting of: $FeSO_4$ or $CuSO_4$, under acidic conditions for a third pre-determined period causing hydrolysis of the cellulose; and recovering the resulting nanocrystalline cellulose.

wherein the starting cellulose has a particle size ranging from 100 to 1000 μm.

Preferably, said cellulose is obtained from a biomass, where said method comprises the following steps:

providing a biomass feedstock comprising: cellulose; hemicellulose; and lignin;

exposing the biomass to a modified Caro's acid selected from the group consisting of:

composition A; composition B and Composition C;

wherein said composition A comprises:

sulfuric acid in an amount ranging from 20 to 70 wt % of the total weight of the composition;

a compound comprising an amine moiety and a sulfonic acid moiety selected from the group consisting of: taurine; taurine derivatives; and taurine-related compounds; and a peroxide;

wherein said composition B comprises:

an alkylsulfonic acid; and a peroxide; wherein the acid is present in an amount ranging from 40 to 80 wt % of the total weight of the composition and where the peroxide is present in an amount ranging from 10 to 40 wt % of the total weight of the composition;

wherein said composition C comprises:

sulfuric acid;

a compound comprising an amine moiety;

a compound comprising a sulfonic acid moiety; and a peroxide;

to create a biomass/acid mixture allow exposure for a period of time sufficient to dissolve enough of the lignin present in said biomass mixture to obtain a kappa number for the cellulose of less than 10 and more preferably, less than 5;

separating the liquid from the solid portion of delignification mixture;

optionally, exposing the solid portion to a caustic composition to dissolve the hemicellulose present therein;

extracting the remaining cellulose; and optionally, adjusting the pH of the cellulose.

BRIEF DESCRIPTION OF THE FIGURES

Features and advantages of embodiments of the present application will become apparent from the following detailed description and the appended figures, in which.

DETAILED DESCRIPTION OF THE INVENTION

Figure 1A:
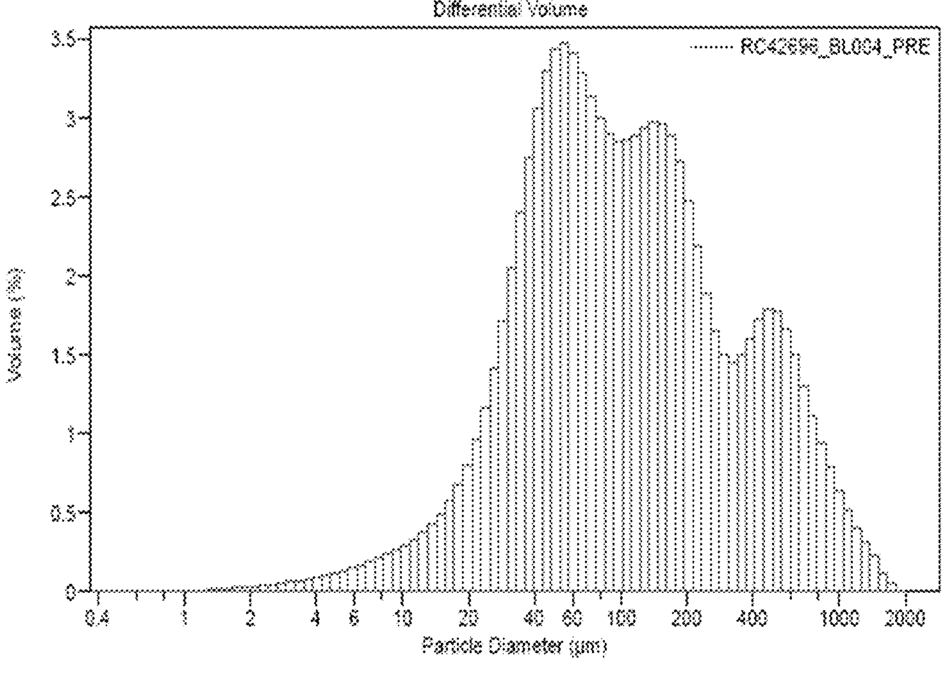
FIGS. 1a, 1b, and 1c are particle size distribution graphs of NDCSW (softwood) (FIG. 1a), NCS-1 (FIG. 1b), and NCS-2 (FIG. 1c)

According to a preferred embodiment of the present invention, there is provided a process for producing nanocrystalline cellulose (NCC) from a feedstock of cellulose the latter which is also referred to as "never dried cellulose" (NDC). NDC is simply a reference to a cellulose which is obtained from a delignification reaction and which has not undergone significant drying subsequent to the delignification step.

According to a preferred embodiment of the present invention, there is provided a process for producing nanocrystalline cellulose (NCC) from a feedstock of cellulose, wherein the particle size of said cellulose ranges between 100 to 1000 μm.

It is known in the industry that cellulose, which is obtained after delignifying biomass, can undergo hornification upon being exposed to drying conditions. Hornification has a significant impact on both the surface chemistry of cellulosic fibers but also on the internal space found within a cellulosic fiber. In certain instances, it is desirably to avoid hornification of the cellulose as it will render future processing of the same much more difficult, depending on the type of processing. Drying of fibers causes the loss of large pores inside the network of cellulose due to increased H bonding and a reduction of the surface area, which does impact the surface chemistry.

It is thought that conventionally obtained cellulose (for example, from the kraft process), contains a significant amount of lignin which requires bleaching for further use. The kraft process is not directed to the removal of hemicellulose whose presence is desirable for paper production as it acts as a binder of the cellulose but which, depending on the chemical reaction the cellulose is exposed, may consume the reagent and prevent an optimal yield. In the present case, the cellulose is to be chemically converted to nanocrystalline cellulose through a radical-based hydrolysis, where the amorphous sections present on cellulosic fibers are more susceptible to the attack of the chemical treatment. Hemicelluloses also exhibit amorphous characteristics, which render them also more susceptible to hydrolysis. Using a pulp which has a significant hemicellulose content would necessarily lead to waste of reagent, which would act upon the hemicellulose rather than on the amorphous sections of cellulose, thereby causing a significant decrease in the yield of NCC, large chemical consumptions, and prolonged reaction times.

According to a preferred embodiment of the present invention, the cellulose used as starting material is low in both lignin and hemicellulose and therefore less prone to chemical reagent waste.

According to a preferred embodiment of the present invention, the cellulose used as starting material is a pulp having a hemicellulose content of less than 15% w/w. Preferably, the hemicellulose content of the cellulose used as starting material is less than 10% w/w. More preferably, the hemicellulose content is less than 5% w/w of the cellulose used as starting material.

According to a preferred embodiment of the present invention, the cellulose used as starting material is a pulp having a Kappa number of less than 5. Preferably, the Kappa number of the cellulose used as starting material is less than 2. More preferably, the Kappa number of the cellulose used as starting material is less than 1.

According to a preferred embodiment of the present invention, the process comprises a step of swelling cellulose in water (or basic solution) that comprises a microemulsion. Preferably, the resulting mixture (also referred to as a suspension) is subsequently treated with low power ultrasonication (ranging from 50 W to 100 W) for a short period of time (15 minutes) to disintegrate the fiber. Finally, the fiber is treated chemically using a mixture of hydrogen peroxide and an iron sulfate catalyst at 60° C.

It was found that soaking a cellulose having a low hemicellulose content with a microemulsion significantly enhanced the NCC yield obtained from catalytic decomposition of hydrogen peroxide with iron sulfate, copper sulfate or iron oxide.

According to a preferred embodiment of the present invention, the pretreatment of the cellulose with a microemulsion allows the subsequent hydrolysis to more efficiently cleave the amorphous cellulose fragments present on the cellulose. By depolymerization of those amorphous cellulose fragments, the process yields the aforementioned NCC. It has been noted that the presence of hemicellulose along with the cellulose will hamper the conversion of said cellulose to NCC. It is believed that a large portion of the chemicals get consumed by the hemicellulose rather than cleaving the amorphous cellulose portions of the cellulose fibers.

According to a preferred embodiment of the present invention, the method was also shown, in some cases, to produce MCC with particle size range 10-100 μm.

Example 1

According to a first preferred embodiment of the present invention, a microemulsion composition was prepared using deionized water, MEA, ethanol, DDBSA (dodecyl benzene sulfonic acid), Novel® 23E7, and Pale Oil 40. The constituents of the composition are listed in Table 1 (below) along with their amounts.

TABLE 1

Composition according to a preferred embodiment of the present invention (Example 1) labelled OSD P215

| Constituent | wt % |
|---|---|
| DI Water | 85.68 |
| MEA | 0.57 |
| Ethanol | 3.75 |
| Novel ® 23E7 | 6.67 |
| DDBSA | 2.83 |
| Pale Oil 40 | 0.50 |
| Total | 100.00 |

Example 2

According to a second preferred embodiment of the present invention, a microemulsion composition was prepared using deionized water, MEA, ethanol, DDBSA (dodecyl benzene sulfonic acid), Novel® 23E7, and Citral. The constituents of the composition are listed in Table 2 (below) along with their amounts.

TABLE 2

Composition according to a preferred embodiment of the present invention (Example 2) labelled OSD C217

| Constituent | wt % |
|---|---|
| DI Water | 84.17 |
| Ethanol | 3.75 |
| MEA | 0.58 |
| DDBSA | 2.83 |
| Novel ® 23E7 | 6.67 |
| Citral | 2.00 |
| Total | 100.00 |

Example 3

According to a third preferred embodiment of the present invention, a microemulsion composition was prepared using deionized water, MEA, ethanol, DDBSA (dodecyl benzene sulfonic acid), Novel® 23E7, and Citral. The constituents of the composition are listed in Table 3 (below) along with their amounts.

TABLE 3

Composition according to a preferred embodiment of the present invention (Example 3) labelled C225

| Constituent | wt % |
|---|---|
| DI Water | 77.77 |
| MEA | 0.85 |
| Ethanol | 5.63 |
| Novel ® 23E7 | 10.00 |
| DDBSA | 4.25 |
| Citral | 1.50 |
| Total | 100.00 |

Example 4

According to a fourth preferred embodiment of the present invention, a microemulsion composition was prepared using deionized water, MEA, Triton™ BG-10, DDBSA (dodecyl benzene sulfonic acid), and Pale Oil 40. The constituents of the composition are listed in Table 4 (below) along with their amounts.

TABLE 4

Composition according to a preferred embodiment of the present invention (Example 4) labelled Nano-X11-3

| Constituent | wt % |
|---|---|
| DI Water | 78.50 |
| MEA | 0.50 |
| Triton BG-10 | 15.00 |
| DDBSA | 5.00 |
| Pale Oil 40 | 1.00 |
| Total | 100.00 |

Example 5

According to a fifth preferred embodiment of the present invention, a microemulsion composition was prepared using deionized water, ethanol, Lutensol® XL-90, Novel® 23E7, and Pale Oil 40. The constituents of the composition are listed in Table 5 (below) along with their amounts.

TABLE 5

Composition according to a preferred embodiment of the present invention (Example 5) labelled FBE P115

| Constituent | wt % |
|---|---|
| DI Water | 86.06 |
| Ethanol | 3.18 |
| Lutensol ® XL-90 | 2.83 |
| Novel ® 23E7 | 5.66 |
| Pale Oil 40 | 2.26 |
| Total | 100.00 |

MEA refers to monoethanolamine. According to another preferred embodiment of the present invention, other alkanolamines can be used. These include, but are not limited to, diethanolamine and triethanolamine.

NOVEL®23E7 and Lutensol® XL-90 surfactants are nonionic surfactants. NOVEL®23E7 is a biodegradable, nonionic surfactant derived from SAFOL 23 alcohol and ethoxylated to an average of 7 moles of ethylene oxide. It is essentially 100% active unless diluted with water. It is a slightly hazy liquid that is readily soluble in water. Lutensol® XL-90 ethoxylates of alkyl polyethylene glycol ethers is based on the C10-Guerbet alcohol. The Lutensol® XL BASF C10-Guerbet alcohol used for the experiments can be better described as follows: the chemical formula is $C_5H_{11}CH(C_3H_7)CH_2OH$ with the restriction that for 70-99 weight % of compound $C_5H_{11}$ means n-$C_5H_{11}$ and for 1-30 weight % $C_5H_{11}$ means $C_2H_5(CH_3)CH_2$ and/or $CH_3CH(CH_3)CH_2CH_2$. According to another preferred embodiment of the present invention, other nonionic surfactants can be used. These include, but are not limited to, linear and branched alcohol ethoxylates with 6-16 carbons and 3-10 moles of EO.

DDBSA is a very versatile surfactant. It exhibits high detergency and excellent foaming character. It can be used in acidic environments as-is or neutralized by numerous bases to form surfactants with many desired properties. Applications for DDBSA include, but are not limited to, household and industrial cleaning applications including cleaners, laundry, carwash, and hard surface care. DDBSA is readily biodegradable.

Pale Oil 40 is a petroleum distillate, hydrotreated heavy naphthenic (CAS #64742-52-5).

Citral is an acyclic monoterpene aldehyde made of two isoprene units. Citral is a collective term which covers two geometric isomers: Geranial (trans-Citral or Citral A); and Neral (cis-Citral or Citral B). Citral appears as a clear yellow colored liquid with a lemon-like odor and has a lower density than water and is insoluble in water.

Triton™ G-10 is an alkyl polyglucoside-based nonionic surfactant. It is soluble in water as well as in highly caustic solutions. It produces a moderate to high stable foam and displays good detergency and wetting properties. Triton™ BG-10 is readily biodegradable. According to another preferred embodiment of the present invention, other polyglucoside-based nonionic surfactants can be used. These include, but are not limited to, polyglucoside-based nonionic surfactants with different alkyl chain length (C6-C15).

Ethanol is used as a way of providing examples but not to limit the composition of the microemulsions. According to another preferred embodiment of the present invention, other alcohols can be used in the preparation of the microemulsions. These include, but are not limited to, lower alcohols such as methanol as well as longer and more branched alcohols such as propanol, isopropanol, butanol, etc.

According to a preferred embodiment of the present invention, the cellulose used in the method to make NCC is an unbleached cellulose which has a very low lignin and hemicellulose content (preferably ranging from 0.5 to 15 wt %). Preferably, the cellulose is obtained by the delignification of a lignocellulosic biomass feedstock through the exposure of such to a modified Caro's acid as per the following methods. A preferred method to delignify biomass comprises the steps of:

- providing a vessel;
- providing biomass comprising lignin, hemicellulose and cellulose fibers into said vessel;
- providing a sulfuric acid component;
- providing a peroxide component;
- exposing said biomass to said sulfuric acid source and peroxide component;
- allowing said sulfuric acid source and peroxide component to come into contact with said biomass for a period of time sufficient to a delignification reaction to occur and remove over 90 wt % of said lignin and hemicellulose from said biomass.

Preferably, the biomass comprising lignin, hemicellulose and cellulose fibers is exposed to a modified Caro's acid composition selected from the group consisting of: composition A; composition B and Composition C;

- wherein said composition A comprises:
  - sulfuric acid in an amount ranging from 20 to 70 wt % of the total weight of the composition;
  - a compound comprising an amine moiety and a sulfonic acid moiety selected from the group consisting of: taurine; taurine derivatives; and taurine-related compounds; and
  - a peroxide;
- wherein said composition B comprises:
  - an alkylsulfonic acid; and
  - a peroxide; wherein the acid is present in an amount ranging from 40 to 80 wt % of the total weight of the composition and where the peroxide is present in an amount ranging from 10 to 40 wt % of the total weight of the composition;
- wherein said composition C comprises:
  - sulfuric acid;
  - a compound comprising an amine moiety;
  - a compound comprising a sulfonic acid moiety; and
  - a peroxide.

A method for removing the constituents of a biomass into separate streams, where said method comprises the following steps:

- providing a biomass feedstock comprising: cellulose; hemicellulose; and lignin;
- exposing the biomass to a modified Caro's acid selected from the group consisting of:
  - composition A; composition B and Composition C;
  - wherein said composition A comprises:
    - sulfuric acid in an amount ranging from 20 to 70 wt % of the total weight of the composition;

a compound comprising an amine moiety and a sulfonic acid moiety selected from the group consisting of: taurine; taurine derivatives; and taurine-related compounds; and a peroxide;

wherein said composition B comprises:

an alkylsulfonic acid; and a peroxide; wherein the acid is present in an amount ranging from 40 to 80 wt % of the total weight of the composition and where the peroxide is present in an amount ranging from 10 to 40 wt % of the total weight of the composition;

wherein said composition C comprises:

sulfuric acid;

a compound comprising an amine moiety;

a compound comprising a sulfonic acid moiety; and a peroxide;

to create a biomass/acid mixture allow exposure for a period of time sufficient to dissolve enough of the lignin present in said remaining biomass mixture to obtain a kappa number for the cellulose of less than 5 and more preferably, less than 2.

According to preferred embodiment of the present invention, the modified Caro's acid (as disclosed in Canadian patent application 3,128,678) comprises: sulfuric acid; a heterocyclic compound; and wherein sulfuric acid and said a heterocyclic compound; are present in a molar ratio of no less than 1:1. Preferably, the sulfuric acid and said heterocyclic compound are present in a molar ratio ranging from 28:1 to 2:1. More preferably, the sulfuric acid and heterocyclic compound are present in a molar ratio ranging from 24:1 to 3:1. Preferably, the sulfuric acid and heterocyclic compound are present in a molar ratio ranging from 20:1 to 4:1. More preferably, the sulfuric acid and heterocyclic compound are present in a molar ratio ranging from 16:1 to 5:1. Preferably, the sulfuric acid and heterocyclic compound are present in a molar ratio ranging from 12:1 to 6:1. Also preferably, said heterocyclic compound has a molecular weight below 300 g/mol. Also preferably, said heterocyclic compound has a molecular weight below 150 g/mol. More preferably, said heterocyclic compound is a secondary amine. According to a preferred embodiment of the present invention, said heterocyclic compound is selected from the group consisting of: imidazole; triazole; and N-methylimidazole.

According to preferred embodiment of the present invention, the modified Caro's acid (as disclosed in Canadian patent application 3,128,677) comprises: sulfuric acid; a modifying agent comprising a compound containing an amine group; and wherein sulfuric acid and said compound containing an amine group; are present in a molar ratio of no less than 1:1. Preferably, the sulfuric acid and said compound containing an amine group are present in a molar ratio ranging from 28:1 to 2:1. More preferably, the sulfuric acid and compound containing an amine group are present in a molar ratio ranging from 24:1 to 3:1. Preferably, the sulfuric acid and compound containing an amine group are present in a molar ratio ranging from 20:1 to 4:1. More preferably, the sulfuric acid and compound containing an amine group are present in a molar ratio ranging from 16:1 to 5:1. Preferably, the sulfuric acid and compound containing an amine group are present in a molar ratio ranging from 12:1 to 6:1. According to a preferred embodiment of the present invention, the modifying agent is selected in the group consisting of: TEOA; MEOA; pyrrolidine; DEOA; ethylenediamine; diethylamine; triethylamine; morpholine; MEA-triazine; and combinations thereof. According to a more preferred embodiment of the present invention, the modifying agent is TEOA; MEOA; pyrrolidine; DEOA; ethylenediamine; tricthylamine.

According to preferred embodiment of the present invention, the modified Caro's acid (as disclosed in Canadian patent application 3,128,676) comprises: sulfuric acid; a modifying agent comprising an alkanesulfonic acid; and wherein sulfuric acid and said alkanesulfonic acid are present in a molar ratio of no less than 1:1. Preferably, said alkanesulfonic acid is selected from the group consisting of: alkanesulfonic acids where the alkyl groups range from CI-C6 and are linear or branched; and combinations thereof. Preferably, said alkanesulfonic acid is selected from the group consisting of: methanesulfonic acid; ethanesulfonic acid; propanesulfonic acid; 2-propanesulfonic acid; isobutylsulfonic acid; t-butylsulfonic acid; butanesulfonic acid; iso-pentylsulfonic acid; t-pentylsulfonic acid; pentanesulfonic acid; t-butylhexanesulfonic acid; and combinations thereof. More preferably, said alkanesulfonic acid is methanesulfonic acid. Also preferably, said alkanesulfonic acid has a molecular weight below 300 g/mol. Also preferably, said alkanesulfonic acid has a molecular weight below 150 g/mol. Preferably, the sulfuric acid and said alkanesulfonic acid and are present in a molar ratio ranging from 28:1 to 2:1. More preferably, the sulfuric acid and alkanesulfonic acid are present in a molar ratio ranging from 24:1 to 3:1. Preferably, the sulfuric acid and alkanesulfonic acid are present in a molar ratio ranging from 20:1 to 4:1. More preferably, the sulfuric acid and alkanesulfonic acid are present in a molar ratio ranging from 16:1 to 5:1. According to a preferred embodiment of the present invention, the sulfuric acid and alkanesulfonic acid are present in a molar ratio ranging from 12:1 to 6:1.

According to preferred embodiment of the present invention, the modified Caro's acid (as disclosed in Canadian patent application 3,128,675) comprises: sulfuric acid; a substituted aromatic compound; and wherein sulfuric acid and said substituted aromatic compound; are present in a molar ratio of no less than 1:1. Preferably, the substituted aromatic compound comprises at least two substituents. More preferably, at least one substituent is an amine group and at least one of the other substituent is a sulfonic acid moiety. According to a preferred embodiment, the substituted aromatic compound comprises three or more substituent. According to a preferred embodiment of the present invention, the substituted aromatic compound comprises at least a sulfonic acid moiety. According to another preferred embodiment of the present invention, the substituted aromatic compound comprises an aromatic compound having a sulfonamide substituent, where the compound can be selected from the group consisting of: benzenesulfonamides; toluenesulfonamides; substituted benzenesulfonamides; and substituted toluenesulfonamides. Preferably, the sulfuric acid and said substituted aromatic compound and are present in a molar ratio ranging from 28:1 to 2:1. More preferably, the sulfuric acid and substituted aromatic compound are present in a molar ratio ranging from 24:1 to 3:1. Preferably, the sulfuric acid and substituted aromatic compound are present in a molar ratio ranging from 20:1 to 4:1. More preferably, the sulfuric acid and substituted aromatic compound are present in a molar ratio ranging from 16:1 to 5:1. Preferably, the sulfuric acid and substituted aromatic compound are present in a molar ratio ranging from 12:1 to 6:1.

According to preferred embodiment of the present invention, the modified Caro's acid (as disclosed in Canadian patent application 3,128,674) comprises: sulfuric acid; a modifying agent comprising an arylsulfonic acid; and optionally, a compound containing an amine group; wherein sulfuric acid and said a arylsulfonic acid; are present in a molar ratio of no less than 1:1. Preferably, the compound containing an amine group is selected from the group consisting of: imidazole; N-methylimidazole; triazole; monoethanolamine (MEOA); diethanolamine (DEOA); tricthanolamine (TEOA); pyrrolidine and combinations thereof. According to a preferred embodiment of the present invention, sulfuric acid and the peroxide are present in a molar ratio of approximately 1:1. Preferably, the sulfuric acid and said arylsulfonic acid and are present in a molar ratio ranging from 28:1 to 2:1. More preferably, the sulfuric acid and arylsulfonic acid are present in a molar ratio ranging from 24:1 to 3:1. Preferably, the sulfuric acid and arylsulfonic acid are present in a molar ratio ranging from 20:1 to 4:1. More preferably, the sulfuric acid and arylsulfonic acid are present in a molar ratio ranging from 16:1 to 5:1. According to a preferred embodiment of the present invention, the sulfuric acid and arylsulfonic acid are present in a molar ratio ranging from 12:1 to 6:1. Also preferably, said arylsulfonic acid has a molecular weight below 300 g/mol. Also preferably, said arylsulfonic acid has a molecular weight below 150 g/mol. Even more preferably, said arylsulfonic acid is selected from the group consisting of: orthanilic acid; metanilic acid; sulfanilic acid; toluenesulfonic acid; benzenesulfonic acid; and combinations thereof.

According to preferred embodiment of the present invention, the modified Caro's acid (as disclosed in Canadian patent application 3,128,673) comprises: sulfuric acid; a heterocyclic compound; an alkanesulfonic acid; and wherein sulfuric acid and said a heterocyclic compound; are present in a molar ratio of no less than 1:1. Preferably, said aqueous acidic composition comprising: sulfuric acid; a heterocyclic compound; an arylsulfonic acid; and wherein sulfuric acid and said a heterocyclic compound; are present in a molar ratio of no less than 1:1. Preferably, the arylsulfonic acid is toluenesulfonic acid. Preferably, the sulfuric acid, the heterocyclic compound and the alkanesulfonic acid are present in a molar ratio ranging from 28:1:1 to 2:1:1. More preferably, the sulfuric acid the heterocyclic compound and the alkanesulfonic acid are present in a molar ratio ranging from 24:1:1 to 3:1:1. Preferably, the sulfuric acid, the heterocyclic compound and the alkanesulfonic acid are present in a molar ratio ranging from 20:1:1 to 4:1:1. More preferably, the sulfuric acid, the heterocyclic compound and the alkanesulfonic acid are present in a molar ratio ranging from 16:1:1 to 5:1:1. According to a preferred embodiment of the present invention, the sulfuric acid and heterocyclic compound are present in a molar ratio ranging from 12:1:1 to 6:1:1. Also preferably, said heterocyclic compound has a molecular weight below 300 g/mol. Also preferably, said heterocyclic compound has a molecular weight below 150 g/mol. Even more preferably, said heterocyclic compound is selected from the group consisting of: imidazole; triazole; n-methylimidazole; and combinations thereof. Preferably, the alkanesulfonic acid is selected from the group consisting of: alkylsulfonic acids where the alkyl groups range from C1-C6 and are linear or branched; and combinations thereof. Preferably, said alkylsulfonic acid is selected from the group consisting of: methanesulfonic acid; ethanesulfonic acid; propanesulfonic acid; 2-propanesulfonic acid; isobutylsulfonic acid; t-butylsulfonic acid; butanesulfonic acid; iso-pentylsulfonic acid; t-pentylsulfonic acid; pentanesulfonic acid; t-butylhexanesulfonic acid; and combinations thereof. More preferably, said alkylsulfonic acid is methanesulfonic acid.

According to preferred embodiment of the present invention, the modified Caro's acid (as disclosed in Canadian patent application 3,128,672) comprises: sulfuric acid; a carbonyl-containing nitrogenous base compound; and wherein sulfuric acid and said a carbonyl-containing nitrogenous base compound; are present in a molar ratio of no less than 1:1. According to a preferred embodiment of the present invention, the carbonyl-containing nitrogenous base compound is selected from the group consisting of: caffeine; lysine; creatine; glutamine; creatinine; 4-aminobenzoic acid; glycine; NMP (N-methyl-2-pyrrolidinone); histidine; DMA (N,N-dimethylacetamide); arginine; 2,3-pyridinedicarboxylic acid; hydantoin; and combinations thereof. Preferably, the sulfuric acid and said carbonyl-containing nitrogenous base compound and are present in a molar ratio ranging from 28:1 to 2:1. More preferably, the sulfuric acid and carbonyl-containing nitrogenous base compound are present in a molar ratio ranging from 24:1 to 3:1. Preferably, the sulfuric acid and carbonyl-containing nitrogenous base compound are present in a molar ratio ranging from 20:1 to 4:1. More preferably, the sulfuric acid and carbonyl-containing nitrogenous base compound are present in a molar ratio ranging from 16:1 to 5:1. According to a preferred embodiment of the present invention, the sulfuric acid and carbonyl-containing nitrogenous base compound are present in a molar ratio ranging from 12:1 to 6:1.

According to a preferred embodiment of the present invention, exposing said biomass to said modified Caro's acid composition will allow the delignification reaction to occur and remove over 90 wt % of said lignin and hemicellulose from said biomass.

Preferably, the delignification reaction is carried out at a temperature below 55° C. by a method selected from the group consisting of:

adding water into said vessel;

adding biomass into said vessel; and using a heat exchanger.

Preferably, said sulfuric acid, said compound comprising an amine moiety and a sulfonic acid moiety and said peroxide are present in a molar ratio of no less than 1:1:1. Also preferably, said sulfuric acid, said compound comprising an amine moiety and a sulfonic acid moiety and said peroxide are present in a molar ratio of no more than 15:1:1.

According to a preferred embodiment of the present invention, said sulfuric acid and said compound comprising an amine moiety and a sulfonic acid moiety are present in a molar ratio of no less than 3:1.

According to a preferred embodiment of the present invention, said compound comprising an amine moiety and a sulfonic acid moiety is selected from the group consisting of: taurine; taurine derivatives; and taurine-related compounds.

According to a preferred embodiment of the present invention, said taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates; as well as aminoalkylsulfonic acids where the alkyl is selected from the group consisting of $C_1$-$C_5$ linear alkyl and $C_1$-$C_5$ branched alkyl. Preferably, said linear alkylaminosulfonic acid is selected form the group consisting of: methyl; ethyl(taurine); propyl; and butyl.

Preferably, said branched aminoalkylsulfonic acid is selected from the group consisting of: isopropyl; isobutyl; and isopentyl.

According to a preferred embodiment of the present invention, said compound comprising an amine moiety and a sulfonic acid moiety is taurine.

According to a preferred embodiment of the present invention, said sulfuric acid and compound comprising an amine moiety and a sulfonic acid moiety are present in a molar ratio of no less than 3:1.

According to a preferred embodiment of the present invention, said compound comprising an amine moiety is an alkanolamine is selected from the group consisting of: monoethanolamine; diethanolamine; triethanolamine; and combinations thereof.

According to a preferred embodiment of the present invention, said compound comprising a sulfonic acid moiety is selected from the group consisting of: alkylsulfonic acids and combinations thereof.

According to a preferred embodiment of the present invention, said alkylsulfonic acid is selected from the group consisting of: alkylsulfonic acids where the alkyl groups range from $C_1$-$C_6$ and are linear or branched; and combinations thereof.

According to a preferred embodiment of the present invention, said alkylsulfonic acid is selected from the group consisting of: methanesulfonic acid; ethanesulfonic acid; propanesulfonic acid; 2-propanesulfonic acid; isobutylsulfonic acid; t-butylsulfonic acid; butanesulfonic acid; iso-pentylsulfonic acid; t-pentylsulfonic acid; pentanesulfonic acid; t-butylhexanesulfonic acid; and combinations thereof.

According to a preferred embodiment of the present invention, said alkylsulfonic acid; and said peroxide are present in a molar ratio of no less than 1:1.

According to a preferred embodiment of the present invention, said compound comprising a sulfonic acid moiety is methanesulfonic acid.

According to a preferred embodiment of the present invention, in Composition C, said sulfuric acid and said a compound comprising an amine moiety and said compound comprising a sulfonic acid moiety are present in a molar ratio of no less than 1:1:1.

According to a preferred embodiment of the present invention, in Composition C, said sulfuric acid, said compound comprising an amine moiety and said compound comprising a sulfonic acid moiety are present in a molar ratio ranging from 28:1:1 to 2:1:1.

Preferably, the sulfuric acid and the peroxide are present in a molar ratio ranging from 7:1 to 1:7.5. More preferably, the sulfuric acid and the peroxide are present in a molar ratio ranging from 3:1 to 1:3. Even more preferably, the sulfuric acid and the peroxide are present in a molar ratio ranging from 2:1 to 1:1.

According to a preferred embodiment of the present invention, the delignification reaction carried out results in a hemicellulose content of less than 15 wt. % of the resulting cellulose. Preferably, the delignification reaction carried out results in a hemicellulose content of less than 10 wt. % of the resulting cellulose. More preferably, the delignification reaction carried out results in a hemicellulose content of less than 5 wt. % of the resulting cellulose.

According to a preferred embodiment of the present invention, the microemulsion is employed as a way to swell the cellulosic fibers resulting from a delignification such as a delignification using modified Caro's acid, to make them more susceptible to the posterior hydrolysis. It is also possible that the microemulsion intercalates between the cellulosic fibers and helps loosening the fiber structure; thus, exposing more fibers to the subsequent hydrolysis.

Experimental Method

According to a preferred embodiment of the present invention, the process consists of three steps (1) soaking of the cellulose, (2) sonication of the mixture, and (3) catalytic decomposition of $H_2O_2$ with $FeSO_4$ or $CuSO_4$.

1) Soaking

According to a preferred embodiment of the present invention, this step comprises the soaking of 4 g bulk of NDC in 250 mL DI water for either 1 h or 24 h. In some cases, 1% v/v microemulsion was added to the DI water before soaking the NDC.

2) Sonication

According to a preferred embodiment of the present invention, this step comprises exposing a suspension of cellulose to a sonication step for 15 minutes using QSonica Sonication probe 4406 with replaceable tip, amplitude of 50%, output of 100 W and frequency of 20 kHz. The summary of the experimental parameters is listed in Table 1 below.

3) Catalytic Decomposition of $H_2O_2$ with $FeSO_4$

According to a preferred embodiment of the present invention, this step comprises the following:

1. 50 mL of pretreated cellulose after step (1) or (2) is added to a 100 mL container with a stir bar.
2. 50 mL of 29% $H_2O_2$ is added to the container
3. 0.5 mL of 10% HCl is added to the container
4. $FeSO_4 \cdot 7H_2O$ (2.5 g/100 mL) is added to the container
5. The container content is then mixed at 150 rpm at 60° C. for 3 or 6 hours.
6. After the reaction time is complete, the reaction is quenched by either cooling the sample in the fridge or diluting the container contents with cold water to 250 mL total.
7. The precipitate was then washed several times using DI water with filtration or centrifuge.
8. Finally, the solid content was dried in the oven at 55° C. for 48 h to measure the total yield.
9. Dry solid was then dispersed in 50 mL DI water using ultrasonication for 10 minutes According to another preferred embodiment of the present invention, the process consists of two steps (1) soaking of the cellulose, and (2) catalytic decomposition of $H_2O_2$ with $FeSO_4$ or $CuSO_4$.

Experiment #1

In this experiment, the source of cellulose used was generated by delignification of softwood (NDCSW) using a modified Caro's acid. This generated a "never dried cellulose" which is substantially free of lignin (Kappa number less than 5). The cellulose was not dried prior to being processed into nanocrystalline cellulose. The source of cellulose contained between 20-30% wt. solids and between 5-15% wt. hemicellulose content.

Samples of softwood-based cellulose were soaked for 24 hours in the solutions listed in Table 1 and then sonicated as per the method described herein for 15 minutes. Table 1 shows the conditions of the experiment.

TABLE 1

List of softwood-based cellulose samples that were soaked and then sonicated

| Sample ID | Additive | Additive (% v/v) | Soaking Time (h) | Cellulose (g/L) |
|---|---|---|---|---|
| NCS-1 | N/A | N/A | 24 | 16 |
| NCS-2 | OSD P215 | 1 | 24 | 16 |

TABLE 1-continued

List of softwood-based cellulose samples that were soaked and then sonicated

| Sample ID | Additive | Additive (% v/v) | Soaking Time (h) | Cellulose (g/L) |
|---|---|---|---|---|
| NCS-3 | OSD C217 | 1 | 24 | 16 |
| NCS-6 | FBE P115 | 1 | 24 | 16 |

Samples post-soaking and sonication were analyzed for particle size distribution using laser diffraction. The results are tabulated in Table 2 below.

TABLE 2

The results of the particle size analysis of samples from Table 1

| Sample ID | Description | $D_{10}$ (μm) | $D_{50}$ (μm) | $D_{90}$ (μm) |
|---|---|---|---|---|
| NDCSW | Initial never dried cellulose source | 27.81 | 99.35 | 531.0 |
| NCS-1 | 15 min sonication after 24 h soaking in water | 14.64 | 62.75 | 341.7 |
| NCS-2 | 15 min sonication after 24 h soaking in 1% Nano-OSD P215 | 14.06 | 65.15 | 351.3 |

Figure 1B:
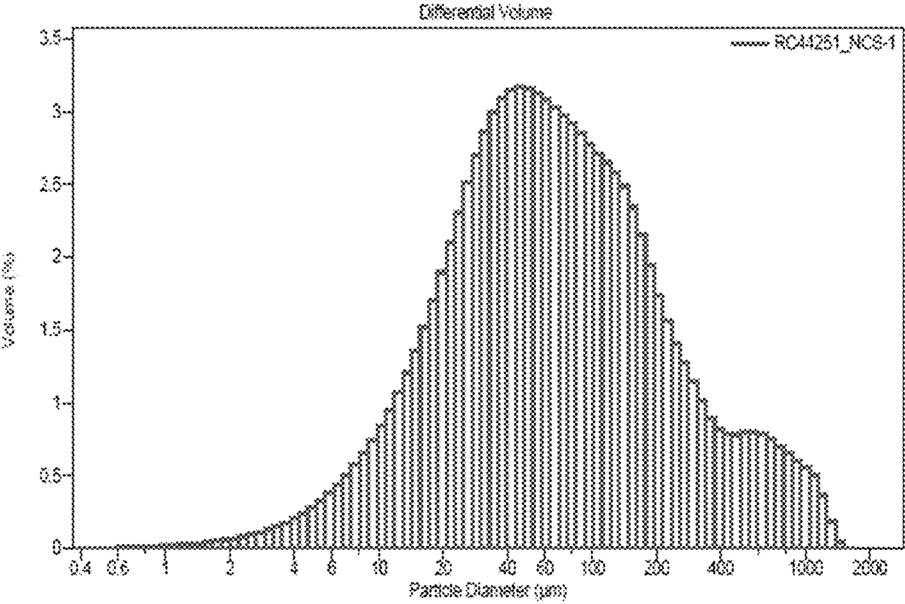
Figure 1C:
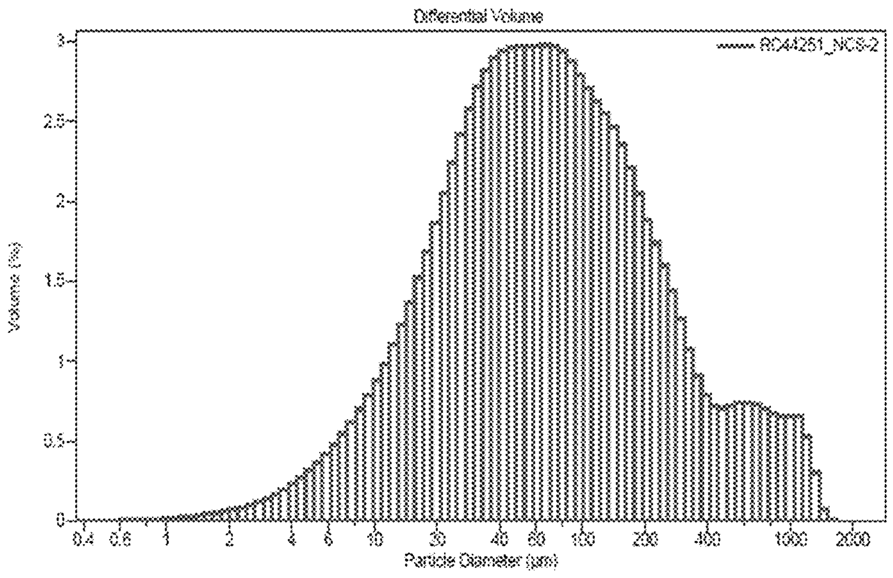

From the data obtained in Table 2, the particle size of cellulose has significantly decreased after 15 minutes of sonication. FIG. 1*a*, FIG. 1*b*, and FIG. 1*c* show that there is a significant reduction in the fraction of particles with particle size above 100 μm after sonication.

The samples from Table 1 were exposed to Catalytic Decomposition using $H_2O_2$ and a solution of iron(II) sulfate heptahydrate using the procedure described herein. Samples were left to decompose for a period of 6 hours. The reaction was then quenched, and the yield was calculated as per the procedure described herein. The summary of these experimental results is listed in Table 3 below. Yields of NCC were calculated by taking an aliquot of the stable dispersion and drying it in the oven at 105° C. It will be understood by those skilled in the art that upon sonication, a dispersion of nanocrystalline cellulose in water will remain stable and will show as a hazy dispersion; larger particles such as microcrystalline cellulose will precipitate to the bottom of the container.

TABLE 3

Conditions for the Catalytic Decomposition for softwood-based cellulose samples in Table 1 where 50 mL of a cellulose suspension was exposed to the catalytic decomposition for 6 hours using 0.5 mL of a 2.5 g/100 mL solution of iron (II) sulfate heptahydrate.

| Sample ID | Cellulose Source | Agent | Sonication | Yield (% wt.) | Observations |
|---|---|---|---|---|---|
| NCS-13 | NCS-1 | N/A | Yes | 13 | Hazy dispersion |
| NCS-15 | NCS-2 | OSD P215 | Yes | 22 | Hazy dispersion, almost transparent |
| NCS-16 | NCS-3 | OSD C217 | Yes | 26 | Hazy dispersion, almost transparent |

From the results displayed in Table 3, it is concluded that NCC was formed as the dispersion was stable and no precipitation was observed. The yields of NCC obtained when the initial cellulose was soaked in a solution containing a microemulsion were significantly higher. In some cases, the yields were double that of those not exposed to a microemulsion. This indicates that the microemulsion assists in swelling the cellulose to make it more susceptible for catalytic hydrolysis.

Experiment #2

The samples from Table 1 were exposed to a catalytic decomposition using $H_2O_2$ and a solution of iron(II) sulfate heptahydrate using the procedure described herein. Samples were left to decompose for a period of 3 hours, after which the reaction was quenched, and the yield calculated. The summary of these experimental results is listed in Table 4 below. Yields were estimated by taking an aliquot of the stable dispersion and drying it in the oven at 105° C.

TABLE 4

Conditions for the Catalytic Decomposition for softwood-based cellulose samples in Table 1 where 50 mL of a cellulose suspension was exposed to the catalytic decomposition for 3 hours using 0.1 mL of a 2.5 g/100 mL solution of iron (II) sulfate heptahydrate.

| Sample ID | Cellulose Source | Agent | Sonication | Yield (% wt.) | Observations |
|---|---|---|---|---|---|
| NCS-20 | NCS-1 | N/A | Yes | 55 | Large flocs suspended |
| NCS-21 | NCS-2 | OSD P215 | Yes | 78 | Top hazy liquid and stable with some cellulose precipitated |
| NCS-23 | NCS-3 | OSD C217 | Yes | 65 | Top hazy liquid and stable with some cellulose precipitated |
| NCS-24 | NCS-6 | FBE P215 | Yes | 65 | Top hazy liquid and stable with some cellulose precipitated |

TEM Micrographs of NCC

Figure 2A:
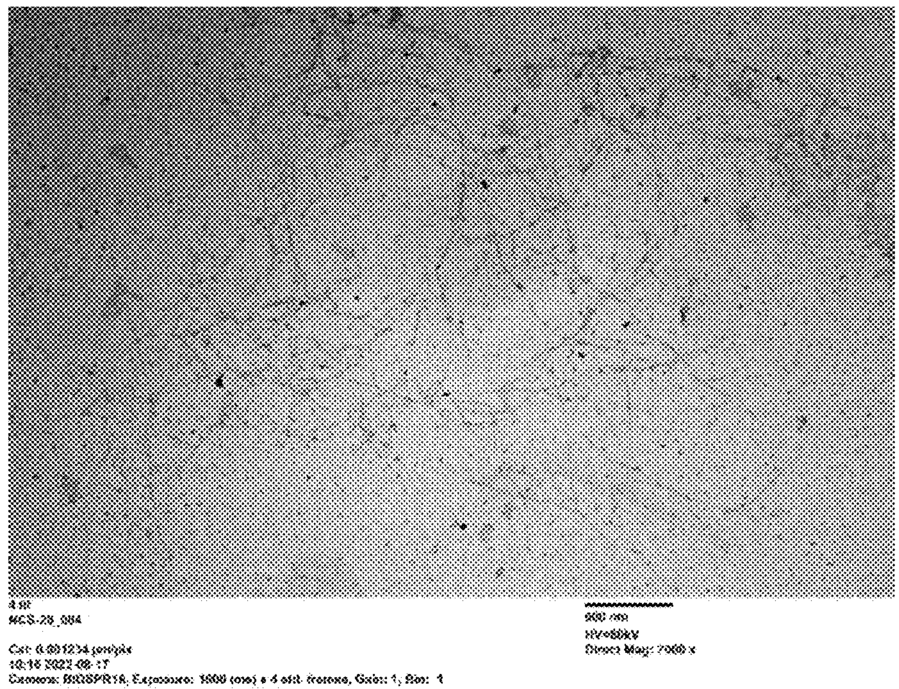
FIGS. 2a, and 2b are TEM micrographs for samples NCS-20, and NCS-21.
Figure 2B:
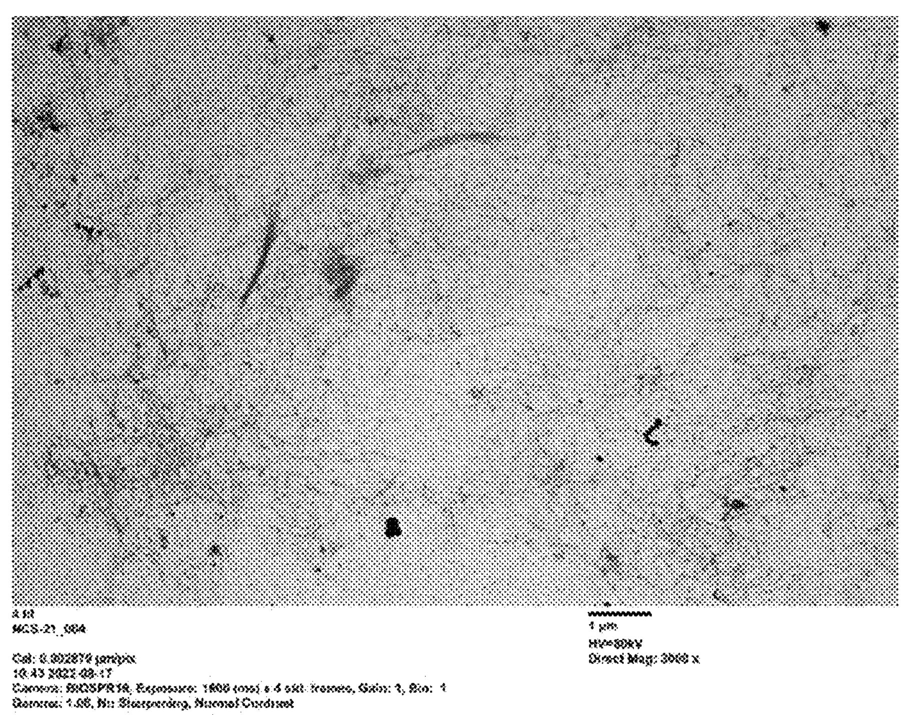

Transmission electron microscopy (TEM) micrographs were taken of the samples NCS-20 and NCS-21. The TEM micrographs (FIGS. 2*a*, and 2*b*) show that the synthesized NCC is very thin and needle-shaped.

Dynamic Light Scattering (DLS) of NCC

Figure 3A:
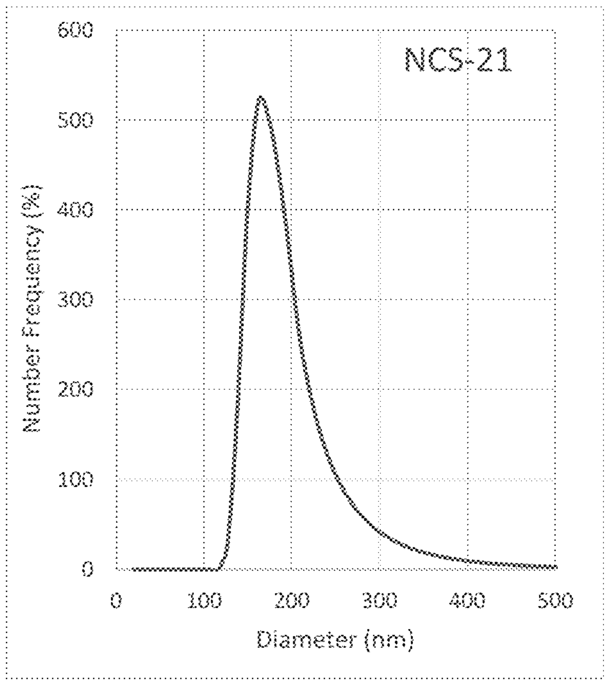
FIGS. 3a, 3b and 3c are graphs showing the NCC particle size distribution for NCS-21, NCS-23 and NCS-24.
Figure 3B:
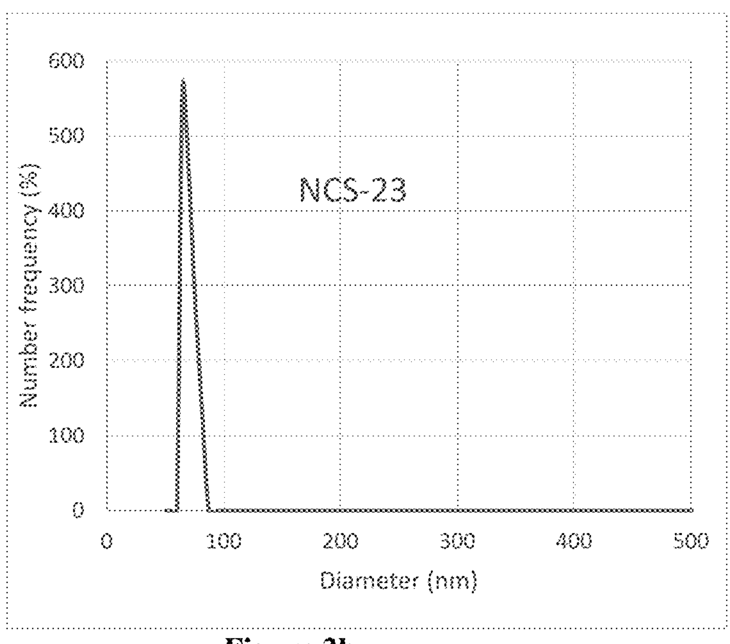
Figure 3C:
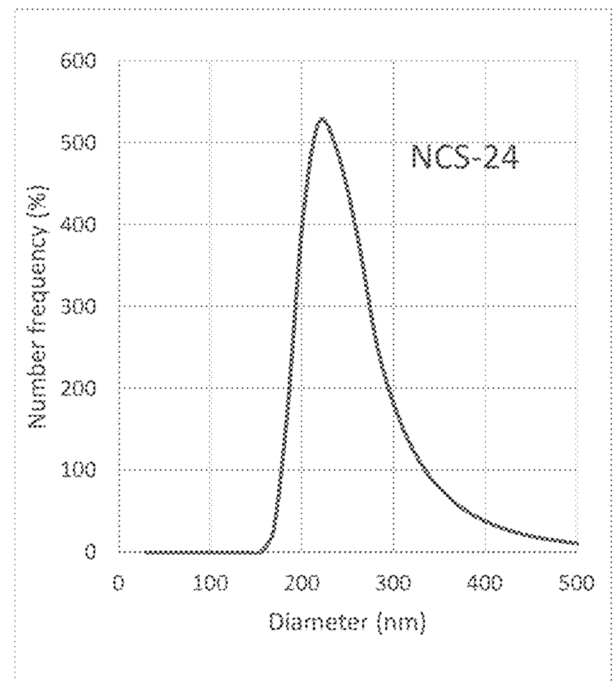

Particle size distribution was measured using DLS. As shown in FIGS. 3*a*, 3*b* and 3*c*, the NCC obtained in Samples NCS-21, NCS-23 and NCS-24 has particle size range between 60 to 500 nm.

Zeta Potential

The Zeta potential was measured for a number of samples. Zeta potentials are used to characterize the stability of the cellulose suspensions. They are reported in Table 5 (below). When the zeta potential measured reports a negative value, it is an indication of the presence of carboxylate groups on the surface of the NCC. Additionally, the general dividing line between stable and unstable suspensions is generally 30 or −30 mV, which shows the suspensions prepared are unstable and that is what leads to the suspended flocs (see Table 4).

TABLE 5

Zeta Potential for Un-neutralized NCC

| Sample # | pH | Zeta Potential (mV) |
|---|---|---|
| NCS-20 | 3.00 | −12.51 |
| NCS-21 | 3.06 | −15.81 |

Optical Microscope

Figure 4A:
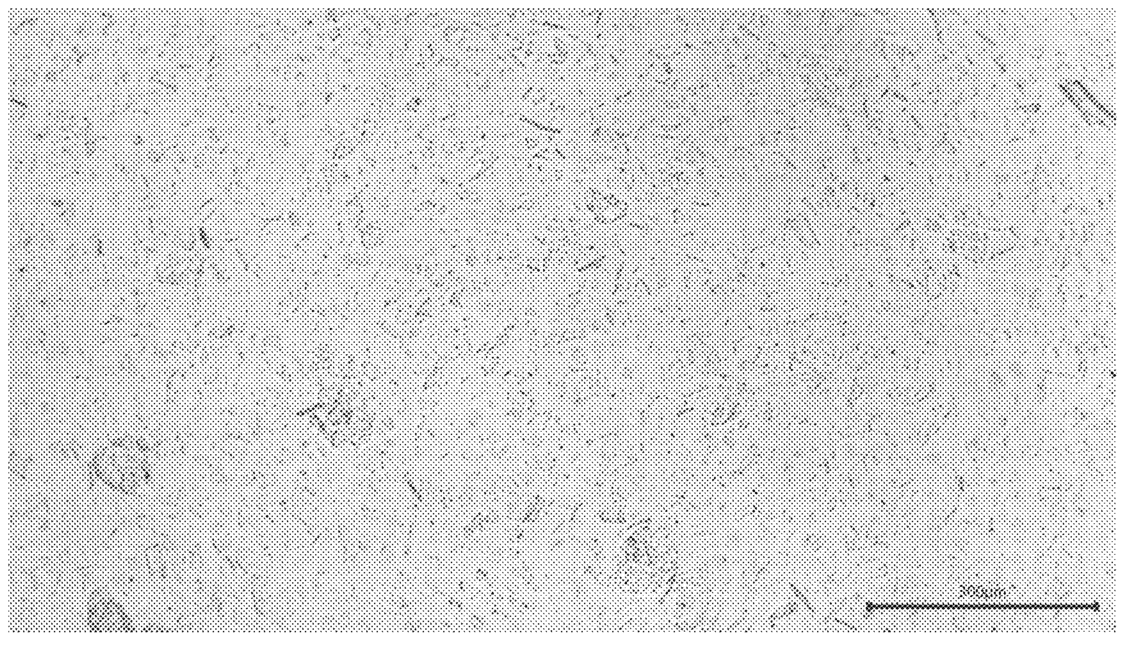
FIGS. 4a, and 4b are photomicrographs of NCS-23, and NCS-24 precipitates with average particle size of 30-50 μm.
Figure 4B:
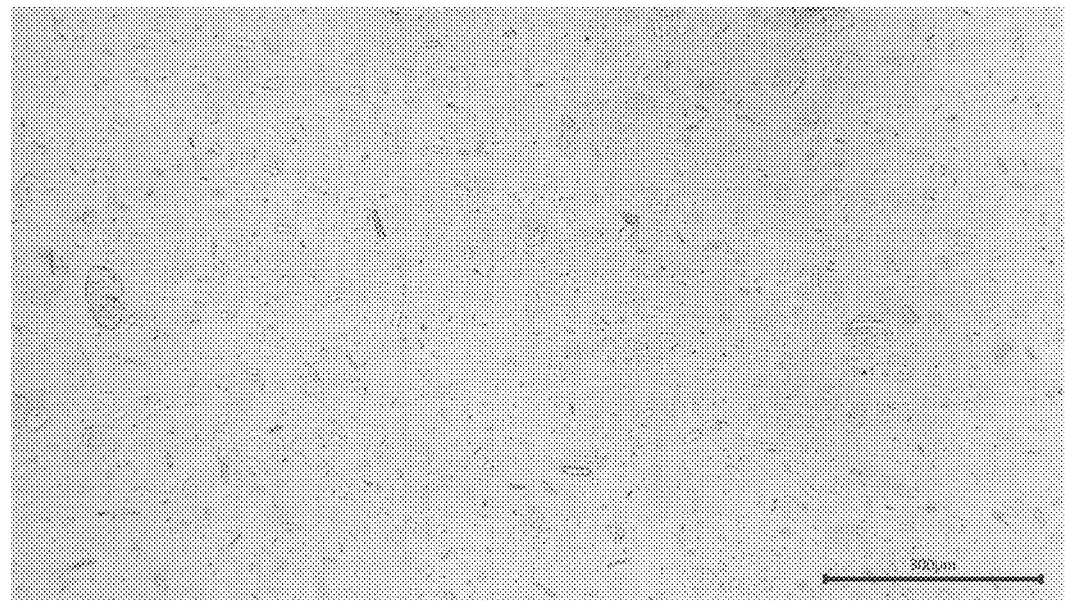

Optical microscope was used to determine the particle size for the portion of the samples that precipitated. FIGS. 4*a*, and 4*b* show that the particle size of the crystalline cellulose in samples NCS-23 and NCS-24 is between 10-100 μm, which is lower than the original particle size (see Table 2 and FIG. 1). Additionally, the particle size distribution looks narrower around the 30-50 μm than the initial particle size distribution, where 50% of the particles were between 60-1000 μm (see Table 2 and FIG. 1). Hence, this method, in part, can be used to produce microcrystalline cellulose (MCC) using environmentally friendly catalytic decomposition of hydrogen peroxide.

It also confirms that a specific type of microemulsion formulation can aid with the manufacture of NCC, while other types of microemulsions are perhaps more appropriately used in the manufacture of MCC.

Experiment #3

In order to evaluate the effect of microemulsion Nano-OSD P215 without sonication as a pretreatment agent, experiments were carried out to single out the performance on conversion of cellulose by exposure to microemulsions only.

For this particular experiment, 4 g bulk of NDC NDCSW was added into 250 mL of DI Water. 2.5 g of OSD-P215 was added to the solution. The suspension was stirred for 24 hrs at ambient temperature. The sample was the left to precipitate. The supernatant was decanted and the precipitate was rinsed thoroughly with DI Water then dried in the oven at 45° C. The summary of the experimental parameters and results is listed in Table 6 below. Yields were estimated by taking an aliquot of the stable dispersion and drying it in the oven at 105° C.

TABLE 6

Summary of the experimental parameters and results for Experiment #3

| Sample ID | MCC Source | Agent | Sonication | 29% $H_2O_2$ (mL) | $FeSO_4 \cdot 7H_2O$ (mL) | 10% HCl (mL) | Yield (wt %) | Observations on final dispersion |
|---|---|---|---|---|---|---|---|---|
| NCS-20 | NCS-1 | N/A | Yes | 50 | 0.1 | 0.5 | 55 | Large flocs suspended |
| NCS-21 | NCS-2 | OSD P215 | Yes | 50 | 0.1 | 0.5 | 78 | A lot of large flocs suspended |

From Table 6, it can be observed that the presence of microemulsion (NCS-31) not only increased the yield after catalytic decomposition but also produced a less turbid solution after sonication with a much lower precipitate compared to the sample without microemulsion (NCS-22). This highlights the important effect of the microemulsion in generating high yields of NCC.

Experiment #4

In this experiment, the source of cellulose used was generated by delignification of hardwood (NDCHW) using a modified Caro's acid. This generated a "never dried cellulose" which is substantially free of lignin (Kappa number less than 5). The cellulose was not dried prior to being processed into nanocrystalline cellulose. The source of cellulose contained between 20-30% wt. solids and between 5-10% hemicellulose content.

Second Set Using Microemulsion Diluted in 8 wt % NaOH without Sonication

A 100 g of 8 wt % NaOH soaking solution was prepared. In some cases, 2 g of Nano-X11-3 was added to the soaking solution. Then, 1.5 g solid cellulose was added to the soaking solution and stirred for 2 hours at ambient temperature. Then, cellulose was filtered out and washed thoroughly using DI water. Finally, the cellulose was dried in the oven at 45° C. for 2 days. The summary of the experimental parameters is listed in Table 7 below.

TABLE 7

Summary of the Experimental parameters for the experiment using Microemulsion Diluted in 8 wt % NaOH without sonication

| Sample ID | MCC Source | Soaking Agent | Soaking Temperature (° C.) | Soaking Time (hrs) |
|---|---|---|---|---|
| S#1 | NDCHW | 100 g of 8 wt % NaOH | 20 | 2 |
| S#2 | NDCHW | 100 g of 8 wt % NaOH + 2 g of Nano-X11-3 | 20 | 2 |

Catalytic Decomposition of $H_2O_2$ with $FeSO_4$

1. The synthesis solution was prepared as in the table below using dry pretreated cellulose
2. The solution was heated to 60° C. while stirring for 5 hours
3. After the synthesis, the samples were cooled down using cold water and then allowed to gravity separate before decanting the free water and filtering the precipitate to clean the NCC
4. Finally, the precipitate was dried in the oven for 2 days at 45° C. to obtain the dry NCC.
5. The dry NCC was then added to 50 mL of DI Water and the pH was adjusted (to pH 8-9) using 50 μL of 10 wt % NaOH. Those samples were then sonicated for 15 minutes to disperse the NCC

TABLE 8

Composition of samples for Catalytic Decomposition of $H_2O_2$ with $FeSO_4$ for Slave Lake Hardwood where the MCC was exposed for 5 hours at 60° C. with no sonication

| Sample ID | Cellulose Source | Cellulose (g) | DIW (mL) | 21.8% $H_2O_2$ (mL) | $FeSO_4$•$7H_2O$ (mL) | 10 wt % HCl (mL) | Yield (wt %) | Dispersion of dry NCC |
|---|---|---|---|---|---|---|---|---|
| NCS-33 | S#1 | 0.11 | 33.5 | 66.5 | 0.1 | 0.5 | 35 | Did not disperse; very cloudy and separation |
| NCS-34 | S#2 | 0.11 | 33.5 | 66.5 | 0.1 | 0.5 | 31 | Dispersed but then separated overtime due to the low zeta potential |

Photographs of samples NCS-33 and NCS-34 were taken and recorded. They establish that, in the absence of microemulsion in the pretreatment step (NCS-33), NCC could not be made as the produced cellulose did not disperse in water upon sonication. In the presence of a microemulsion in the pretreatment step (NCS-34), NCC was achieved as evidenced by a dispersion. Moreover, the NCC was fully dispersed in water after sonication. From this set of experiments, it can be concluded that swelling cellulose in 8 wt % NaOH in the presence of a microemulsion according to a preferred embodiment of the present invention labelled Nano-X11-3 did, in fact, generate, NCC. Based on these observations, it is likely that the yield calculation was inaccurate for NCS-33 and considered MCC instead of NCC. It is known to those skilled in the art that laboratory scale experimentation may have larger errors due to the small volumes handled.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A process to manufacture nanocrystalline cellulose from a cellulose having a low hemicellulose content, said process comprising the steps of:

exposing said cellulose to a solution comprising a microemulsion for a first pre-determined period of time, thereby creating a soaked cellulose;

optionally, exposing the soaked cellulose to a sonication step for a second predetermined period of time; and exposing the resulting mixture to a source of peroxide with a metal salt selected from the group consisting of: $FeSO_4$ or $CuSO_4$ under acidic conditions for a third pre-determined period causing hydrolysis of the cellulose; and recovering the resulting nanocrystalline cellulose, wherein the starting cellulose has a particle size ranging from 100 to 1000 μm.

2. The process according to claim 1, wherein the nanocrystalline cellulose will have a crystallinity index of more than 50% and an aspect ratio ranging from 10:1 length to width to 50:1 length to width.

3. The process according to claim 1, wherein said microemulsion composition comprises:

water;

a solvent;

a nonionic surfactant;

a hydrophobic component.

4. The process according to claim 3, where the solvent is selected from the group consisting of: ethanol; methanol; isopropanol; propanol and other short chain alcohols.

5. The process according to claim 3, where the nonionic surfactant is selected from the group consisting of alcohol ethoxylates and/or alkyl polyglucosides.

6. The process according to claim 3, where the hydrophobic component is selected from the group consisting of mineral oil, silicon oil, paraffin oil, and pale oil or a terpene.

7. The process according to claim 3, where an inorganic and/or organic base is added to the microemulsion; where said base is selected from the group consisting of: sodium hydroxide, potassium hydroxide, ammonium hydroxide and alkanolamines and combinations thereof.

8. The process according to claim 4, where the hydrophobic component is present in the composition in an amount ranging from 0.1 wt. % to 20% wt.

9. The method according to claim 4, where the hydrophobic component is present in the composition in an amount ranging from 1 wt. % to 15% wt.

10. The method according to claim 4, where the solvent is present in the composition in an amount ranging from 0.1 wt. % to 20% wt.

11. The method according to claim 4, where the microemulsion composition is added to the water in a concentration ranging from 0.1 to 90% wt.

12. A process to manufacture nanocrystalline cellulose from cellulose having a low lignin and low hemicellulose content, said process comprising the steps of:

exposing said cellulose to a microemulsion composition for a first pre-determined period of time, thereby creating a soaked cellulose;

optionally, exposing the soaked cellulose to a sonication step for a second predetermined period of time;

exposing the resulting mixture to a source of peroxide with a metal salt selected from the group consisting of: $FeSO_4$ or $CuSO_4$ under acidic conditions, for a third pre-determined period causing hydrolysis of the cellulose; and recovering the resulting nanocrystalline cellulose.

13. A method for the preparation of nanocrystalline cellulose from a biomass, where said method comprises the following steps:

providing a biomass feedstock comprising: cellulose; hemicellulose; and lignin;

exposing the biomass to a modified Caro's acid selected from the group consisting of:

composition A; composition B and composition C;

wherein said composition A comprises:

sulfuric acid in an amount ranging from 20 to 70 wt % of the total weight of the composition;

a compound comprising an amine moiety and a sulfonic acid moiety selected from the group consisting of: taurine; taurine derivatives;

and taurine-related compounds; and a peroxide;

wherein said composition B comprises:

an alkylsulfonic acid; and a peroxide; wherein the acid is present in an amount ranging from 40 to 80 wt % of the total weight of the composition and where the peroxide is present in an amount ranging from 10 to 40 wt % of the total weight of the composition;

wherein said composition C comprises:

sulfuric acid;

a compound comprising an amine moiety;

a compound comprising a sulfonic acid moiety; and a peroxide;

to create a biomass/acid mixture;

allow exposure for a period of time sufficient to dissolve enough of the lignin present in said biomass mixture to obtain a kappa number for the cellulose of less than 10;

separating the liquid from the solid portion of delignification mixture;

optionally, exposing the solid portion to a caustic composition to dissolve the hemicellulose present therein;

extracting the remaining cellulose;

optionally, adjusting the pH of the cellulose;

exposing said cellulose to a microemulsion composition for a first pre-determined period of time, thereby creating a soaked cellulose;

optionally, exposing the soaked cellulose to a sonication step for a second predetermined period of time;

exposing the resulting mixture to a source of peroxide with a metal salt selected from the group consisting of: $FeSO_4$ or $CuSO_4$, for a third pre-determined period causing hydrolysis of the cellulose; and recovering the resulting nanocrystalline cellulose.

14. A method for increasing the yield of nanocrystalline cellulose from a cellulose having a low hemicellulose content, said process comprising the steps of:

exposing said cellulose to a solution comprising a microemulsion for a first pre-determined period of time, thereby creating a soaked cellulose;

optionally, exposing the soaked cellulose to a sonication step for a second predetermined period of time; and exposing the resulting mixture to a source of peroxide with a metal salt selected from the group consisting of: $FeSO_4$ or $CuSO_4$, under acidic conditions for a third pre-determined period causing hydrolysis of the cellulose; and recovering the resulting nanocrystalline cellulose;

wherein the starting cellulose has a particle size ranging from 100 to 1000 μm.

15. The method of claim 14, wherein said cellulose is obtained from a biomass, where said method comprises the following steps:

providing a biomass feedstock comprising: cellulose; hemicellulose; and lignin;

exposing the biomass to a modified Caro's acid selected from the group consisting of:

composition A; composition B and Composition C;

wherein said composition A comprises:

sulfuric acid in an amount ranging from 20 to 70 wt % of the total weight of the composition;

a compound comprising an amine moiety and a sulfonic acid moiety selected from the group consisting of: taurine; taurine derivatives;

and taurine-related compounds; and a peroxide;

wherein said composition B comprises:

an alkylsulfonic acid; and a peroxide; wherein the acid is present in an amount ranging from 40 to 80 wt % of the total weight of the composition and where the peroxide is present in an amount ranging from 10 to 40 wt % of the total weight of the composition;

wherein said composition C comprises:

sulfuric acid;

a compound comprising an amine moiety;

a compound comprising a sulfonic acid moiety; and a peroxide;

to create a biomass/acid mixture;

allow exposure for a period of time sufficient to dissolve enough of the lignin present in said biomass mixture to obtain a kappa number for the cellulose of less than 10;

separating the liquid from the solid portion of delignification mixture;

optionally, exposing the solid portion to a caustic composition to dissolve the hemicellulose present therein;

extracting the remaining cellulose; and optionally, adjusting the pH of the cellulose.

16. The method according to claim 14, wherein said microemulsion composition comprises:

water;

a solvent;

a nonionic surfactant;

a hydrophobic component.

17. The method according to claim 16, where the solvent is selected from the group consisting of: ethanol; methanol; isopropanol; propanol and other short chain alcohols.

18. The method according to claim 16, where the nonionic surfactant is selected from the group consisting of alcohol ethoxylates and/or alkyl polyglucosides.

19. The method according to claim 16, where the hydrophobic component is selected from the group consisting of mineral oil, silicon oil, paraffin oil, and pale oil or a terpene.

20. The method according to claim 16, where an inorganic and/or organic base is added to the microemulsion; where said base is selected from the group consisting of: sodium hydroxide, potassium hydroxide, ammonium hydroxide and alkanolamines, and combinations thereof.

21. The method according to claim 16, where the hydrophobic component is present in the composition in an amount ranging from 0.1 wt. % to 20% wt.

22. The method according to claim 16, where the hydrophobic component is present in the composition in an amount ranging from 1 wt. % to 15% wt.

23. The method according to claim 16, where the solvent is present in the composition in an amount ranging from 0.1 wt. % to 20% wt.

24. The method according to claim 16, where the microemulsion composition is added to the solution in a concentration ranging from 0.1 to 90% wt.

* * * * *